US007495211B2

(12) United States Patent
Franzen et al.

(10) Patent No.: US 7,495,211 B2
(45) Date of Patent: Feb. 24, 2009

(54) MEASURING METHODS FOR ION CYCLOTRON RESONANCE MASS SPECTROMETERS

(75) Inventors: Jochen Franzen, Bremen (DE); Evgenij Nikolaev, Moscow (RU)

(73) Assignee: Bruker Daltonik GmbH, Bremen (DE)

( * ) Notice: Subject to any disclaimer, the term of this patent is extended or adjusted under 35 U.S.C. 154(b) by 319 days.

(21) Appl. No.: 11/243,510

(22) Filed: Oct. 4, 2005

(65) Prior Publication Data

US 2006/0226357 A1 Oct. 12, 2006

(30) Foreign Application Priority Data

Dec. 22, 2004 (DE) ....................... 10 2004 061 821

(51) Int. Cl.
*B01D 59/44* (2006.01)

(52) U.S. Cl. ........................ 250/291; 250/281; 250/282

(58) Field of Classification Search ................. 250/307, 250/281–300

See application file for complete search history.

(56) References Cited

U.S. PATENT DOCUMENTS

| | | | | |
|---|---|---|---|---|
| 3,937,955 | A * | 2/1976 | Comisarow et al. | 250/283 |
| 4,931,640 | A | 6/1990 | Marshall et al. | |
| 4,933,547 | A * | 6/1990 | Cody, Jr. | 250/282 |
| 4,959,543 | A * | 9/1990 | McIver et al. | 250/291 |
| 5,019,706 | A | 5/1991 | Allemann et al. | |
| 5,572,035 | A | 11/1996 | Franzen | |
| 6,107,628 | A | 8/2000 | Smith et al. | |
| 6,403,955 | B1 * | 6/2002 | Senko | 250/292 |
| 6,583,408 | B2 | 6/2003 | Smith et al. | |
| 6,803,565 | B2 | 10/2004 | Smith et al. | |
| 6,828,549 | B2 * | 12/2004 | Schweikhard et al. | 250/281 |
| 6,906,319 | B2 * | 6/2005 | Hoyes | 250/282 |
| 6,987,261 | B2 * | 1/2006 | Horning et al. | 250/282 |
| 6,992,283 | B2 * | 1/2006 | Bateman et al. | 250/287 |
| 7,071,464 | B2 * | 7/2006 | Reinhold | 250/282 |
| 7,095,014 | B2 * | 8/2006 | Hoyes | 250/282 |
| 2003/0001084 | A1 * | 1/2003 | Bateman et al. | 250/281 |

(Continued)

FOREIGN PATENT DOCUMENTS

| | | | |
|---|---|---|---|
| DE | 39 14 838 | C2 | 5/1989 |
| DE | 195 15 271 | A1 | 11/1996 |
| DE | 690 30 145 | T2 | 3/1997 |
| EP | 0413482 | A2 | 6/2006 |
| GB | 2 417 124 | A | 2/2006 |
| WO | WO 2004/110583 | A2 | 12/2004 |

OTHER PUBLICATIONS

Prior, et al., "Improved Capillary Inlet Tube Interface for Mass Spectrometry—Aerodynamic Effects to Improve Ion Transmission", Computing and Information Sciences 1999 Annual Report, pp. 1-3, 1999.

(Continued)

*Primary Examiner*—Jack I Berman
*Assistant Examiner*—Andrew Smyth
(74) *Attorney, Agent, or Firm*—Law Offices of Paul E. Kudirka

(57) ABSTRACT

The invention relates to measuring methods and corresponding measuring cells for ion cyclotron resonance mass spectrometers (FTMS). The invention provides measuring methods with measuring cells, the ends of which each incorporate a large number of trapping electrodes, DC voltages of opposite polarities being applied across adjacent electrodes. For orbiting ions this builds up a repelling pseudopotential, which holds the ions in the measuring cell by reflection. This facilitates measurement of the image currents without the disturbing influence of RF voltages.

18 Claims, 4 Drawing Sheets

U.S. PATENT DOCUMENTS

| | | | | |
|---|---|---|---|---|
| 2003/0071211 | A1 | 4/2003 | Kawato | |
| 2003/0213900 | A1 * | 11/2003 | Hoyes | 250/282 |
| 2004/0217272 | A1 * | 11/2004 | Horning et al. | 250/282 |
| 2004/0245452 | A1 * | 12/2004 | Bateman et al. | 250/287 |
| 2004/0245455 | A1 * | 12/2004 | Reinhold | 250/288 |
| 2005/0092911 | A1 * | 5/2005 | Hoyes | 250/282 |

OTHER PUBLICATIONS

Lin, et al., "Ion Transport by Viscous Gas Flow through Capillaries", Department of Chemistry, American Society for Mass Spectrometry, pp. 874-885, 1994.

Whitehouse, et al., "Electrospray Interface for Liquid Chromatographs and Mass Spectrometers", Analytical Chemistry, vol. 57, American Chemical Society, pp. 675-679, 1985.

Kim, et al., "Improved Ion Transmission from Atmospheric Pressure to High Vacuum Using a Multicapillary Inlet and Electrodynamic Ion Funnel Interface", Analytical Chemistry, vol. 72, No. 20, pp. 5014-5019, 2000.

Kim, T., Udseth HR, Smith RD, "Improved Ion Transmission from Atmospheric Pressure to High Vacuum Using a Multi-Capillary Inlet and Electrodynamic Ion Funnel Interface", Analytical Chemistry, vol. 72, No. 20, Oct. 15, 2000, pp. 5014-5019.

Nikolaev, E.N., "DC electric field free ICR cell for simultaneous trapping of positive and negative ions", (IMSC-16), Edinburgh, Scotland, Aug. 31, 2003.

* cited by examiner

MEASURING METHODS FOR ION CYCLOTRON RESONANCE MASS SPECTROMETERS

FIELD OF THE INVENTION

The invention relates to measuring methods and corresponding measuring cells for ion cyclotron resonance mass spectrometers (FTMS).

BACKGROUND OF THE INVENTION

In ion cyclotron resonance mass spectrometers (ICR-MS), the mass-to-charge ratios m/z of ions are measured by their cyclotron motions in a homogeneous magnetic field with high field strength. The magnetic field is usually generated by superconductive magnetic coils cooled with liquid helium. Nowadays they provide usable cell diameters of around 6 to 12 centimeters at magnetic field strengths of 7 to 12 Tesla.

The orbital frequency of the ions (ion cyclotron frequency) is measured in ICR measuring cells located within the homogeneous part of the magnetic field. The cylindrical ICR measuring cell normally comprises four longitudinal electrodes in the shape of a fourfold slit cylinder parallel to the magnetic field lines, surrounding the measuring cell. Usually, two of these electrodes are used to bring ions, which are introduced close to the axis, into their cyclotron orbits (into their cyclotron motion), ions with the same mass-to-charge ratio being excited as in-phase as possible in order to obtain a synchronously orbiting clouds of ions. The other two electrodes serve to measure the orbiting of the ion clouds by their image currents, which are induced in the electrodes as the ion clouds fly past. The term "image currents" is normally used even though it is actually the induced "image voltages" which are measured. The process of introducing the ions into the measuring cell, ion excitation and ion detection are carried out in successive phases of the method.

Since the mass-to-charge ratio of the ions (referred to below simply as "specific mass", and sometimes simply as "mass") is unknown before the measurement, the ions are excited by a mixture of all possible excitation frequencies. The mixture can be a temporal mixture in which the frequencies increase with time (called a "chirp"), or it can be a synchronous, computer-calculated mixture of all frequencies (a "sync pulse"). By specially selecting the phases, the synchronous mixture of the frequencies can be formed so that the amplitudes of the mixture remain restricted to the dynamic range of the digital-to-analog converter, which produces the time sequence of analog voltages forming the mixture of frequencies.

The image currents induced by the ions in the detection electrodes are amplified, digitized and analyzed by Fourier analysis for the orbital frequencies of the different ion clouds with different specific masses present therein. The Fourier analysis transforms the original measurements of the image current values in the "time domain" into frequency values in a "frequency domain", hence the term Fourier transform mass spectrometry (FTMS). The specific masses of the ions and their intensities are then determined from the frequencies of the signals, which can be recognized as peaks in the frequency domain. Owing to the extraordinarily high constancy of the magnetic fields used, and the high accuracy for frequency measurements, it is possible to achieve an extraordinarily accurate mass determination. At present, Fourier transform mass spectrometry is the most accurate of all types of mass spectrometry. Ultimately, the accuracy of mass determination depends only on the number of ion orbits which can be detected by the measurement.

The longitudinal electrodes usually form a measuring cell with a square or circular cross-section. The cylindrical measuring cell usually contains four cylinder segments as longitudinal electrodes. Cylindrical measuring cells are the ones most commonly used because they offer the best utilization of the magnetic field, although the image currents of focused clouds of ions with the same mass (image voltages) come close to a rectangular curve. However, the smearing of the ion clouds, which is always observed, leads to image current signals for each ionic species which have a rather more sinusoidal shape.

Since the ions can move freely in the direction of the magnetic field lines, the ions, which each possess velocity components in the direction of the magnetic field from the filling process, must be prevented from leaving the measuring cell. To prevent ion losses, the measuring cells are therefore equipped at both ends with electrodes, known as "trapping electrodes". These are supplied with ion-repelling DC potentials in order to keep the ions in the measuring cell. There are widely differing configurations for this electrode pair; the simplest ones comprise planar electrodes with a central aperture. The aperture serves to introduce the ions into the measuring cell.

The ion-repelling potentials form a potential sink in the interior of the measuring cell, with a parabolic potential profile along the axis of the measuring cell. The potential profile is only slightly dependent on the configuration of these electrodes. The potential profile along the axis is at its minimum at precisely the mid-point of the measuring cell if the ion-repelling potentials across both electrodes have the same value. The ions introduced will therefore execute oscillations in this potential well in the axial direction—so-called trapping oscillations—because they posses kinetic energy in the axial direction left over from their introduction into the cell. The amplitude of these trapping oscillations depends on their kinetic energy.

The electric field outside the axis of the measuring cell is more complicated. Owing to the potentials of the trapping electrodes at the ends and the longitudinal electrodes, the electric field inevitably contains components in the radial direction of the cell which generate a second type of ion motion: the magnetron circular motion. The magnetron gyroscopic motion is also a circular motion about the axis of the measuring cell, but much slower than the cyclotron circular motion. The additional magnetron circular motion causes the mid-points of the cyclotron circular motions to rotate around the axis of the measuring cell at the frequency of the magnetron motion, with the result that the trajectory of the ions describes a cycloidal motion.

The superimposition of magnetron and cyclotron circular motion is an undesirable phenomenon which leads to a frequency shift in the cyclotron frequency. Furthermore, it leads to a reduction in the usable volume of the measuring cell. The measured frequency $\omega_m$ (the "reduced cyclotron frequency") amounts to $$\omega_m = \frac{\omega_c}{2} + \sqrt{\frac{\omega_c^2}{4} - \frac{\omega_t^2}{2}},$$

where $\omega_c$ is the undisturbed cyclotron frequency, and $\omega_t$ the frequency of the trapping oscillation. The trapping oscillation determines the effect of the magnetron circular motion on the cyclotron circular motion. A measuring cell without magnetron circular motion would be very advantageous because the cyclotron frequency could be directly measured and no corrections would have to be applied.

In principle, it is possible to switch the type of motion of the orbiting ions to and fro between a pure magnetron motion and a pure cyclotron motion by supplying and removing energy to the different types of motion by means of quadrupolar excitation, which requires four excitation electrodes, with RF pulses that have a mixture of frequencies. It is thus possible to generate a pure cyclotron motion if the irradiation is ended in the correct phase. But a further dipolar excitation of the cyclotron motion immediately generates a magnetron motion again.

The vacuum in the measuring cell must be as good as possible because, during measurement of the image currents, the ions must not collide with molecules of residual gas. Each collision of an ion with a molecule of residual gas brings the ion out of the orbiting phase of the other ions with the same specific mass. The loss of phase homogeneity leads to a reduction in the image currents and to a continuous decrease in the signal-to-noise-ratio, which reduces the usable measuring period. The measurement period should amount to at least a few hundred milliseconds, ideally a few seconds. This requires a ultrahigh vacuum in the region of $10^{-7}$ to $10^{-9}$ Pascal.

Apart from the vacuum, the space charge in the ion cloud can also adversely affect the measurement. The Coulomb repulsion between the ions themselves and, above all, the elastic reflection of the ions moving in the cloud lead to a large number of disturbances, which also result in an expansion of the cloud. In present-day instruments, the space charge, alongside the effects of pressure, represents the greatest limitation on achieving high mass accuracy.

For higher specific ion masses, the decrease in the cyclotron orbital frequency of the ions is inversely proportional to the mass. The resolution, however, is proportional to the number of measured orbits; it is therefore lower for ions of high specific masses than for those of low specific masses, although it is of particular interest for high ion masses to have a high resolution and, correspondingly, a high mass accuracy. Ever since the introduction of ion cyclotron mass spectrometers, attempts have repeatedly been made to increase the resolution for higher specific ion masses as well, by using a larger number of detection electrodes to multiply the frequency of the image currents in relation to the cyclotron frequency. If a total of 16 detection electrodes are used instead of two, then the two phases of the image current are each measured eight times, and the measured frequency increases by a factor of eight. It is to be expected that resolution and mass accuracy are also increased by a factor of eight if measured over the same measuring time. This requires that the diameter of the orbiting ion cloud be not much larger than the width of the detection electrodes. The use of a large number of detection electrodes is therefore precluded by the continuous increase in volume of the ion clouds and especially their magnetron motion.

Unfortunately, these experiments have had such limited success that they have regularly been abandoned. The reasons for the moderate success have been briefly mentioned above, but they have basically not been fully explained. It can be assumed that the ion clouds do not hold together well enough and that, for this reason, they cannot be brought close enough to the detection electrodes. Narrow electrodes require that the ion clouds are brought very close, as otherwise it is scarcely possible to induce the full image currents.

Recently, measuring cells for ion cyclotron resonance mass spectrometry have been described in which practically no magnetron circular motion can develop. (E. Nikolaev, Lecture at the International Mass Spectrometry Conference (IMSC) in Edinburgh, September 2003). In this case, the trapping electrodes are replaced with fine bipolar grid structures, to which an RF voltage is applied and which thus reflect ions of both polarities because of their pseudopotential if the ions possess a specific mass above a mass threshold. The mass threshold can be adjusted by the RF voltage. Grid and punctiform electrode structures of this type have been proposed in U.S. Pat. No. 5,572,035 (J. Franzen). The pseudopotential has a very short range of the order of magnitude of the separations between these structural elements. The reflection resembles a hard reflection on a matt disk, the scattering effect of the matt disk decreasing as the angle of incidence flattens out.

An RF field around the tip of a wire decreases outward in proportion to $1/r^2$; the RF field of a long wire decreases at $1/r$, where r is the distance from the tip or axis of the wire. Both RF fields repel both positive and negative particles. The particle oscillates in the RF field. Regardless of its charge, it experiences the strongest repelling force when it is located near to the wire, i.e. at the point where the field strength is highest. It experiences the strongest attractive force when it is at the furthermost point, i.e. at the point on its oscillation path where the field strength is lowest. Integration over time results in a repulsion. This time-integrated repulsion potential is known as “pseudopotential”, sometimes also as “effective potential” or “quasi-potential”. The pseudopotential is proportional to the square of the RF field, i.e. it decreases outward at $1/r^2$ in the case of a long wire. Moreover, the pseudopotential is inversely proportional to the specific mass m/z of the particles and to the square $\omega^2$ of the RF frequency $\omega$. There is a lower mass threshold for the reflection of the particles.

A relatively easily manufactured surface, made of a grid of parallel wires, where the grid wires are connected alternately to the phases of an RF voltage, has a very short-range pseudopotential. The RF field of a grid with wires of 0.1 millimeter, one millimeter apart, falls to 5% in one millimeter, to 0.2% in two millimeters and to 0.009% in three millimeters. The pseudopotential, which is proportional to the square of this field, falls off much more quickly: At a distance of one millimeter, there is a pseudopotential of only 0.25% of the pseudopotential on the surface of the wire.

In measuring cells with trapping electrodes which have this type of pseudopotential, the ions are stored as fine ion clouds in the shape of a string each with no magnetron motion. Owing to their kinetic energy, the ions can move to and fro in the axial direction in the ion string; they undergo hard reflection at each of the trapping electrodes. The slightly scattering reflections lead to minuscule helical motions of the ions. The ion string as a whole can now be excited via suitable chirp or sync pulses so that they perform cyclotron motions. In the orbiting ion string, the scattering effect of the reflections also decreases, so that the diameter of the ion string only increases very slowly. These long ion strings can consist of significantly more ions than previous measuring cells without the space charge adversely affecting the cyclotron circular motion. Furthermore, the space charge only allows the diameter of the ion string to increase very slowly.

It is possible to arrange the grids of the trapping electrodes so that the crosstalk of the RF voltage at the grid wires onto the image-current measuring electrodes is very low. Unfortunately, it cannot be eliminated completely, however. The frequency of the trapping RF must therefore be set in a range outside that of the induced cyclotron frequencies of the ions, and attempts must be made to remove the induced voltage residues with electrical filter methods. However, since the RF voltages of the trapping electrodes lie between 10 and 100 volts, but the image voltages are only in the range of microvolts or less, this filtering is difficult. Moreover, it appears that overtones, ripple voltages and interferences repeatedly result in frequencies in the range of the image currents, making measurement difficult.

SUMMARY OF THE INVENTION

The invention provides measuring methods and measuring cells which, on the one hand, achieve a reflection of the ions at the trapping electrodes by means of short-range pseudopotentials and, on the other, facilitate detection of the image currents without disturbances from interfering RF voltages.

The measuring cell of the invention is equipped with trapping plates at the ends of the measuring cell which have a large number of trapping electrodes. It is possible to use a large number of punctiform electrodes for this, or long electrodes which run radially. In the latter case, the deviations of their directions from the radial direction should not be large, for example no more than about 35°. Adjacent trapping electrodes can be alternately connected to different potentials. This arrangement may be termed a "bipolar electrode structure" or in the case of long, wire-type trapping electrodes, a "bipolar grid" for short. If the two phases of an RF voltage are applied to adjacent trapping electrodes, this generates repelling pseudopotentials which make it possible for the ions to execute a cyclotron motion without magnetron motion in the ICR measuring cell. Alternatively, a DC voltage, which repels the ions, can be applied to all the trapping electrodes commonly, which permits a conventional mode of operation with corresponding magnetron motion.

In contrast of this RF or common DC supply, the method of the invention now applies two DC voltages of opposite polarities to adjacent trapping electrodes, at least during the measuring phase, so that the orbiting ions alternately cross positively and negatively charged trapping electrodes. These spatially alternating DC potentials form a reflecting pseudopotential for fast-flying ions which has the same effect as an RF voltage applied to the trapping electrodes has for slow-flying ions. The ions are reflected at the structured trapping plates without generating a magnetron motion or maintaining an existing magnetron motion. Since no RF voltage is applied during the measuring phase, however, this invention helps to ensure that the detection of the image currents is not disturbed.

A method according to the invention for operating an ion cyclotron resonance mass spectrometer thus preferably comprises the following steps: (a) in the magnetic field of the mass spectrometer, a measuring cell is provided which incorporates not only excitation and detection electrodes along the sides but also trapping plates at the ends with preferably long, predominantly radial trapping electrodes, which form a bipolar grid, (b) the two phases of an RF voltage or an ion-repelling DC voltage are applied to the bipolar grid of the trapping electrodes, (c) the measuring cell is filled with ions, (d) the ions are excited to cyclotron motions by excitation pulses applied at the excitation electrodes, (e) DC potentials of opposite polarities are applied to the bipolar grid of the trapping electrodes, (f) the image currents, which are generated by the orbiting ion clouds of different ion species in the detection electrodes, are measured and the measured values are converted in the usual way into specific masses of the circulating ion clouds.

The usual way of calculating the specific masses consists in amplifying and digitizing the image currents, transforming the digitized measurements of the time domain by Fourier transformation into frequency values of the frequency domain and converting the outstanding signals of the ion signal frequencies into masses.

The large number of trapping electrodes can be applied to ceramic plates, glass or plastic circuit boards, for example. Photolithography, laser etching, or microfabrication can be used for this, usually after metallization of the plates.

If the same DC voltage across all trapping electrodes is used for the capture process of the injected ions, then the trapping plates in the center can be equipped with an open aperture, as has been usual until now for the trapping plates. It is then possible to supply the bipolar grid with a bipolar DC voltage if the ions are excited to rather small cyclotron trajectories; it is not necessary to achieve the complete radius of the cyclotron trajectories used for the measurement at this stage. A small radius just outside the aperture is sufficient for this. If so desired, the magnetron motion can then be eliminated by means of a quadrupolar irradiation of an RF frequency mixture. If the repelling DC voltage is replaced with the spatially alternating bipolar DC voltage, the orbiting ion strings then extend to the region in front of the trapping plates. A further excitation of the cyclotron motions then no longer leads to magnetron motions.

If, on the other hand, an RF voltage across a bipolar grid is used for the capture process, then the central apertures in the trapping electrodes must be sealed with a free-floating bipolar wire grid, through which the ions are introduced into the measuring cell.

Moreover, the measuring cell can contain more than just two detection electrodes, bringing about a multiplication of the measured frequency of the image currents in the time domain compared with the cyclotron frequency. This increases the mass resolution and the mass accuracy. The lack of, or reduction in, magnetron motion with the method according to the invention and the measuring cell according to the invention means that the diameter of the ion clouds is smaller, making it possible to use a larger number of detection electrodes.

The formation of a fine, long ion string for ions having the same specific mass in a cell such as this (instead of a dense bunch of ions in the center of the cell) prevents the space charge from expanding the ion string too quickly in the direction radial to its axis. If the design of the fine trapping electrodes is favorable, the diameter of the ion string also only increases slowly as a result of the reflections at the trapping electrodes, so that the fine string is maintained over a longer period than has been the case in previous measuring cells. The lack of magnetron motion then makes it possible to guide this fine ion string closer to the detection electrodes than would have been possible in measuring cells with magnetron motion.

The measuring cells with many longitudinal electrodes arranged cylindrically can be operated in various ways. In a cell with eight longitudinal electrodes, for example, it is thus possible to use four electrodes for the measurement, two of them for the one measuring polarity and two for the opposite measuring polarity. Two electrodes are used for the dipolar excitation of the ions and a further two electrodes are available for a quadrupole excitation. The quadrupolar excitation can be used to transform magnetron motion which is possibly superimposed into a pure cyclotron motion.

BRIEF DESCRIPTION OF THE DRAWINGS

The above and further advantages of the invention may be better understood by referring to the following description in conjunction with the accompanying drawings in which.

DETAILED DESCRIPTION

Figure 1:
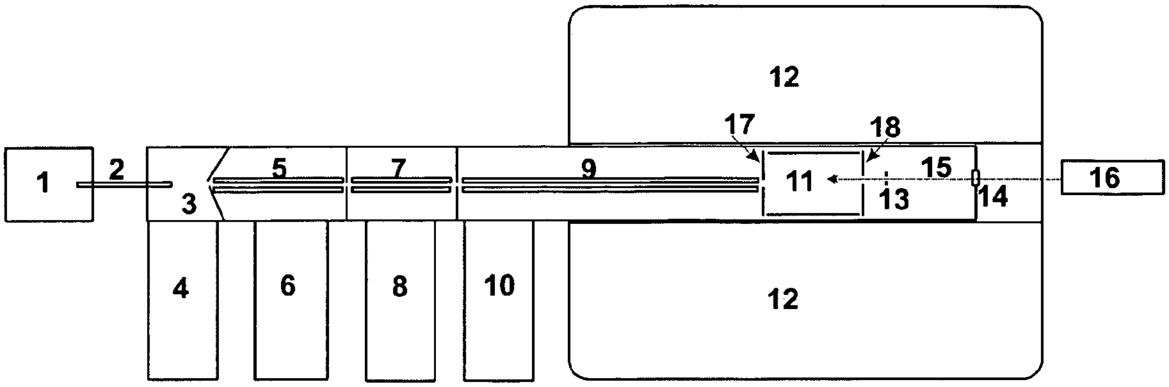
FIG. 1 shows the schematic arrangement of a standard Fourier transform mass spectrometer with a measuring cell (11) in a magnet (12) with a superconductive coil.

The operation and function of an ion cyclotron resonance mass spectrometer can be explained in greater detail using FIG. 1. The ions are, for example, generated by electrospray ionization in an out-of-vacuum ion source (1), and introduced together with ambient gas through a capillary (2) into the first stage (3) of a differential pump system, which comprises the chambers (3), (5), (7) and (9) and is evacuated by the pumps (4), (6), (8) and (10). The ions are captured by the ion guides (5), (7) and (9) and guided to the measuring cell (11), where they are confined. The measuring cell (11) usually comprises four longitudinal excitation and detection electrodes and two trapping electrodes (17) and (18), each of which has a central aperture. The measuring cell is located in the homogeneous region of a strong magnetic field, which is generated by superconductive coils in a helium cryostat (12) and has a magnetic field strength of high constancy. Electrons can be generated by a thermionic cathode (13) and introduced into the measuring cell in order to bring about a fragmentation of biopolymer ions by electron capture dissociation (ECD). A laser (16) can send an infrared laser beam (15) through a window (14) into the measuring cell to fragment ions by infrared multiphoton dissociation (IRMPD).

Figure 2:
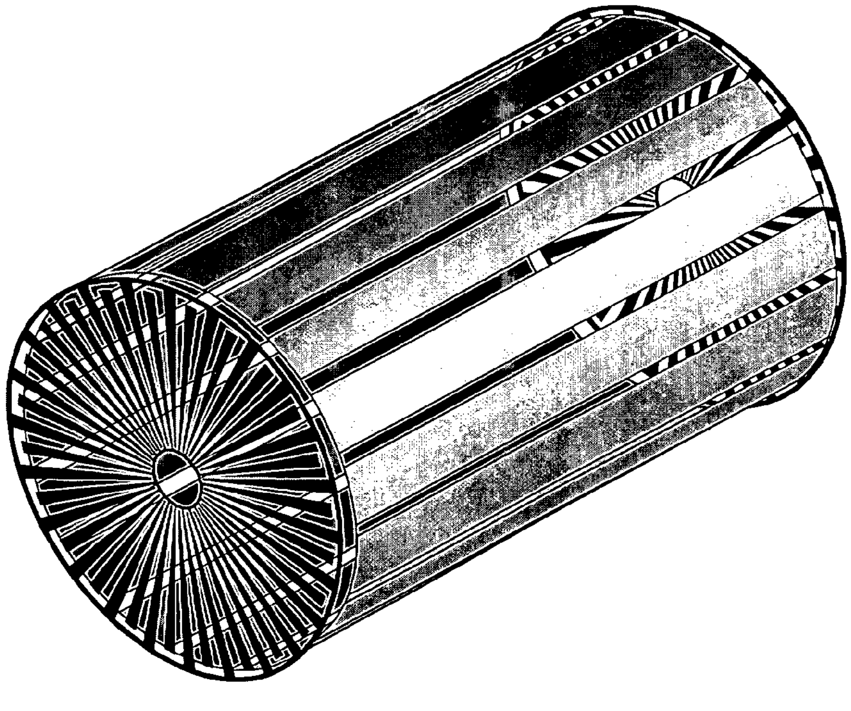
FIG. 2 shows the principle of a cylindrical measuring cell according to this invention with a bipolar radial grid structure for the end trapping electrodes and 16 longitudinal electrodes. The measuring cell is shown purely schematically without any of the insulating holders for the longitudinal electrodes and the trapping grids and without any of the electrical connections.

The usual measuring cell (11) is replaced with a measuring cell according to the invention, which has trapping electrodes at both ends, consisting of fine structural elements, as schematically represented in FIG. 2. This can entail a large number of trapping electrodes distributed punctually; in FIG. 2, however, a radial bipolar electrode grid is used. The measuring cell can be equipped with four or more longitudinal electrodes. How this cell is used for measuring the masses of ions is described in detail below.

Figure 3:
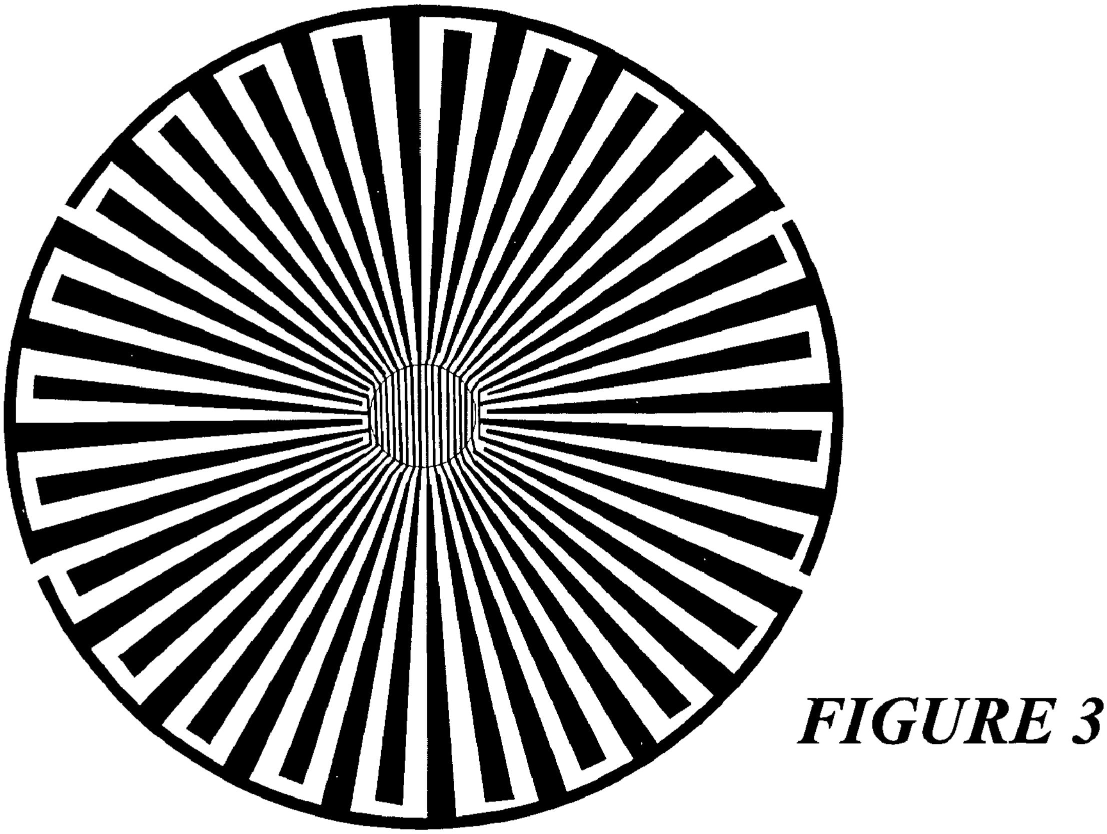
FIG. 3 schematically illustrates a bipolar radial grid structure for the trapping electrodes, in which the round central aperture in a plate-type substrate is covered with a free-floating bipolar grid. These trapping electrodes can be operated with an RF voltage in order to build up a pseudopotential as the ions are introduced, this pseudopotential preventing the escape of the ions. After the ions have been excited to cyclotron motions, the RF voltage is replaced with a bipolar DC voltage in order not to impose any RF interferences on the measurement of the image currents.

FIG. 3 shows a bipolar grid structure for the trapping plates which has a radial arrangement and where, in addition, the central aperture in the plate-type substrate is bridged by a grid. A trapping plate like this can be operated with a two-phase RF voltage while the measuring cell is being filled with ions, and this RF voltage precludes a magnetron motion from the very beginning. The RF grid here is configured so that every other wire of the grid is connected to one phase of the RF voltage, and the intermediate wires to the other phase. This results in an overall repelling pseudopotential, which acts on ions of both polarities, as described in detail in U.S. Pat. No. 5,572,035.

The effect of the RF trapping electrodes is to produce a completely different electrical potential distribution in the measuring cell than arises in normal measuring cells. In a normal measuring cell a parabolic potential well is formed along the axis, and much more complicated potential distributions outside the axis, with a saddle point in the center of the measuring cell. In contrast, there are practically no potential differences within the measuring cell with RF trapping electrodes. There is only a pseudopotential with a very short range directly in front of the trapping electrodes. This rules out the formation of the magnetron motions of the ions. The stored ions form narrow ion strings which stretch from one trapping plate to the other. The kinetic energy of the ions means that they travel to and fro in the ion strings and undergo hard reflection at the pseudopotential of the trapping plates. If a sufficient number of ions are stored in the measuring cell, the ion strings are excited to cyclotron motions by chirp or sync pulses at the excitation electrodes.

After the ions have been excited to cyclotron motions, the two-phase RF voltage across the bipolar trapping grid is replaced with a bipolar DC voltage. The bipolar DC voltage comprises a positive and a negative DC voltage of the same absolute value. DC voltages of different polarity are present at adjacent grid elements. The ions orbiting in cyclotron motions, whose low kinetic energy in axial direction (generally less than 500 millielectron-volts) causes them to slowly approach the trapping plates, experience a rapid change of positive and negative potentials, which represent a repelling pseudopotential for them. They are repelled by reflection and hence confined in the measuring cell. There is now no longer any RF voltage and so, according to the invention, the image currents can be measured undisturbed.

Figure 4:
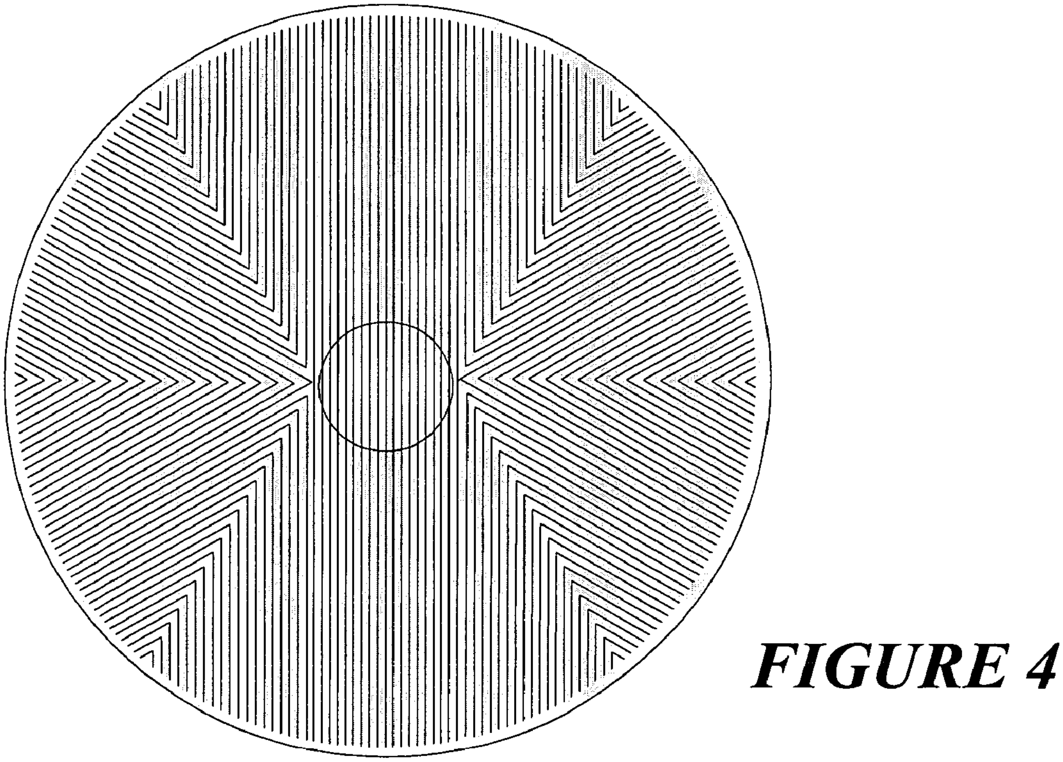
FIG. 4 represents another type of grid structure which can also be operated with RF voltages and which allows operation with a spatially alternating bipolar DC voltage for the measuring phase because the elements of the grid structure are predominantly radially aligned.

FIG. 4 shows a structure of the trapping electrodes which can also be used both for operation with two-phase RF voltage and for operation with bipolar DC voltages. The grid electrodes are no longer strongly radially aligned, instead, they do have the same distances everywhere.

Figure 5:
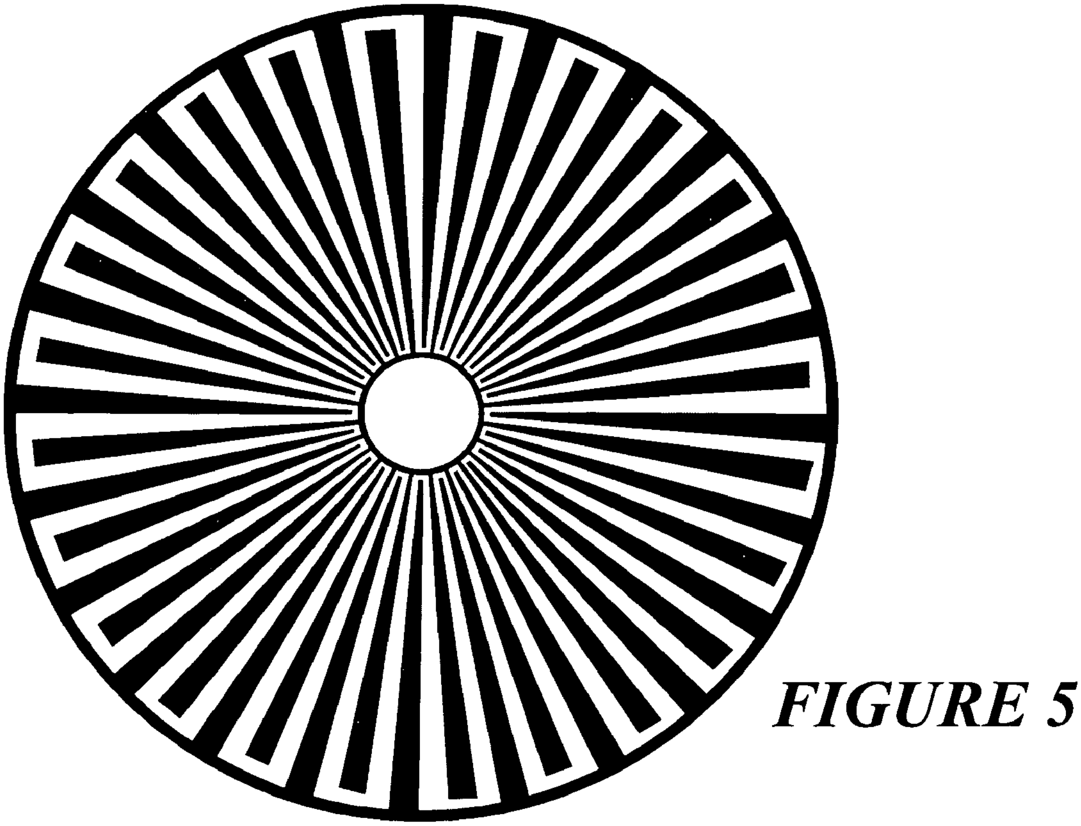
FIG. 5 schematically illustrates a bipolar radial grid structure for the trapping electrodes with a round central aperture in the plate-type substrate for the introduction of the ions. These trapping electrodes are only operated with DC voltages, initially with a single DC voltage to store the ions as in conventional operation, then with an alternating bipolar DC voltage for the measuring mode.

FIG. 5 is a more detailed illustration of a bipolar grid with a central aperture in the plate-type substrate of the electrode structure. The voltage supply is via two contact rings externally and around the central aperture to the radial electrodes. The two contact rings can also be on the rear of the plate-type substrate. In this case the grid electrodes extend over the edges of the plates to the contact rings.

This grid structure with central aperture is particularly suitable for applications with pure DC voltages. During the filling phase, all the grid electrodes are connected to the same DC potential; the measuring cell can then be filled in the conventional way. After the excitation of the cyclotron motions, the DC potential is replaced with two opposite DC voltages across the bipolar grid.

The filling process of a measuring cell with these trapping plates initially also generates magnetron motions and normal trapping oscillations of the ions, which collect in the potential well in the center of the measuring cell and oscillate in axial direction. Exciting the cyclotron motions with chirp or sync pulses amplifies the magnetron motions; the ions now orbit the axis in cycloidal trajectories. The excitation now only needs to be continued until these cycloidal trajectories lie outside the central aperture. If the magnetron motions are very small, it is now possible to replace the regular DC voltage across the trapping electrodes with a bipolar alternating DC voltage; the cyclotron motions can be excited further, and the image currents can be measured.

The remaining magnetron motions widen the string-shaped ion beam, however. It is therefore expedient to first remove the magnetron motion. This is done with a quadrupolar irradiation by RF pulses of a precisely measured length, which transforms the cycloidal trajectories of the ions into precisely circular trajectories around the axis of the measuring cell. If the RF voltage across the trapping electrodes is now replaced with a bipolar alternating DC voltage, fine ion strings are produced which can be further excited to circular trajectories with larger diameters. There is one ion string each for ions of one specific mass, which orbits with its characteristic cyclotron frequency. If the circular trajectories are guided sufficiently close to the detection electrodes, the image currents can be measured undisturbed according to the invention.

The different types of structural elements of the trapping electrodes can be simply printed onto a ceramic disk, in a way analogous to the technique used for printed circuit boards or for microstructuring. Etching methods in conjunction with photolithography or lasers can also be used. The central aperture, preferably with a diameter of four to six millimeters, can, if desired, be bridged with very thin, free-floating wires which are bonded onto the board, or left free-standing using etching methods.

Instead of the ceramic board it is also possible to use a board made of special glass or a plastic which does not pollute the ultra-high vacuum. More complicated electrode structures can be used instead of the wire grid, as described in U.S. Pat. No. 5,572,035, for example an arrangement of tips, or mixtures of point electrodes and a meshed grid, with one tip in each mesh.

With frequencies of a few megahertz and voltages of a few tens of volts, pseudopotential barriers of a few volts are generated between the wires of a wire grid. This is sufficient to confine the ions. At lower voltages, the ions can be injected as a fine ion string beyond the potential saddles between the wires and into the axis of the measuring cell at low kinetic energies of fractions of an electron-volt. The ions in the measuring cell usually have kinetic energies of up to 300 millielectron-volts, or at the maximum around 500 millielectron-volts, with which they oscillate in the axial direction of the measuring cell.

Figure 7:
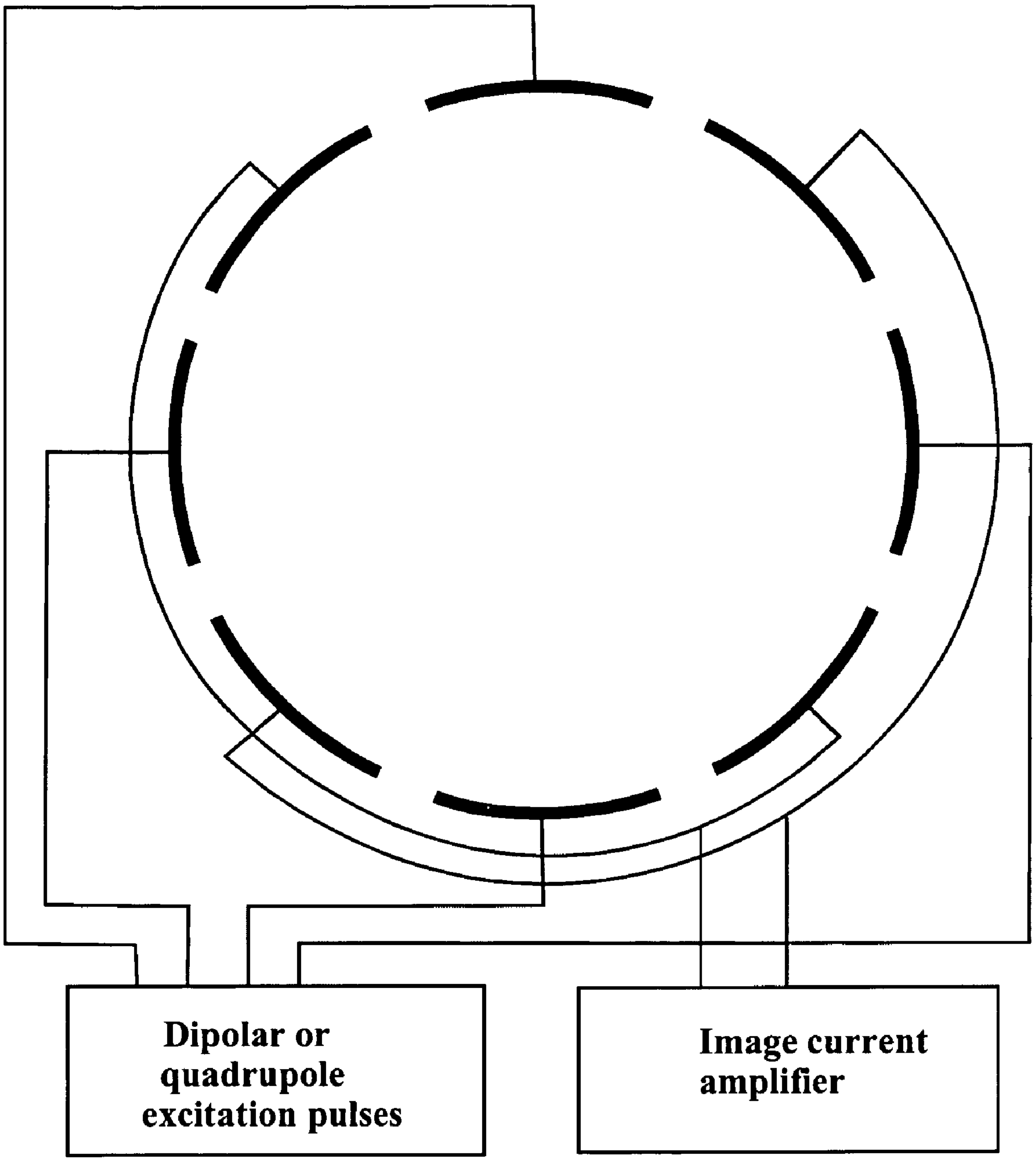
FIG. 7 illustrates a configuration of the measuring cell with eight longitudinal electrodes, four of which are used to measure the image currents so that a doubled cyclotron frequency of the ions is measured. Two of the electrodes serve to excite the cyclotron motions of the ions by excitation pulses (“chirps” or “syncs”), while the two remaining electrodes can be used in conjunction with the excitation electrodes for a quadrupolar excitation.

The measuring cell can, as usual, have four longitudinal electrodes, two of which are used for exciting the ions to cyclotron motions, and two for measuring the image currents. It is, however, more favorable to use at least eight longitudinal electrodes. With eight longitudinal electrodes, as shown in FIG. 7, two longitudinal electrodes can be used to excite the ions, and four to measure the image currents. This results in a doubling of the measured orbital frequency, leading to an increase in the mass resolution and the mass accuracy. The two remaining longitudinal electrodes can be used in conjunction with the excitation electrodes for the quadrupolar excitation.

When using 16 longitudinal electrodes, for example, four longitudinal electrodes can be used for the excitation, and eight longitudinal electrodes, distributed uniformly over the cylindrical surface of the measuring cell, for measuring the image currents, which now measure a four-fold orbital frequency. The four remaining longitudinal electrodes can be used in conjunction with the excitation electrodes for the irradiation of a quadrupolar excitation.

The longitudinal electrodes can also be used for two purposes in succession: first for exciting the ions by chirp or sync pulses and then as detectors. This requires that the connections are switched after the excitation. The switchover times are not critical. It is sufficient if they are of the order of milliseconds. This means that both electronic changeover units and mechanical changeover switches are suitable. The changeover switches must have extraordinarily low contact resistances, for which contacts wetted with mercury in suitable bulbs are favorable.

The excitation of the ion beam by excitation electrodes to produce cyclotron motion does, however, have one disadvantage with the previous design of the measuring cell. Owing to the trapping electrodes, which are connected to the two-phase RF voltage or the bipolar alternating DC voltage, there is a mean potential which corresponds to the ground potential. This causes the excitation pulses to generate a potential distribution across the excitation electrodes in the interior of the measuring cell; this potential distribution is not the same in every cross-section throughout the measuring cell, but varies in the axial direction and practically disappears in front of the trapping electrodes. For conventional trapping electrodes connected to a single DC voltage, an arrangement known as an "infinity cell" was published a long time ago (DE 39 14 838 C2; M. Allemann and P. Caravatti). This arrangement divides the trapping electrodes into fields, to which attenuated excitation pulses are applied so as to simulate the effect of infinitely long excitation electrodes. The fields simulate the potential distribution which is present in the central cross-section of the measuring cell as a result of the excitation pulses.

Figure 6:
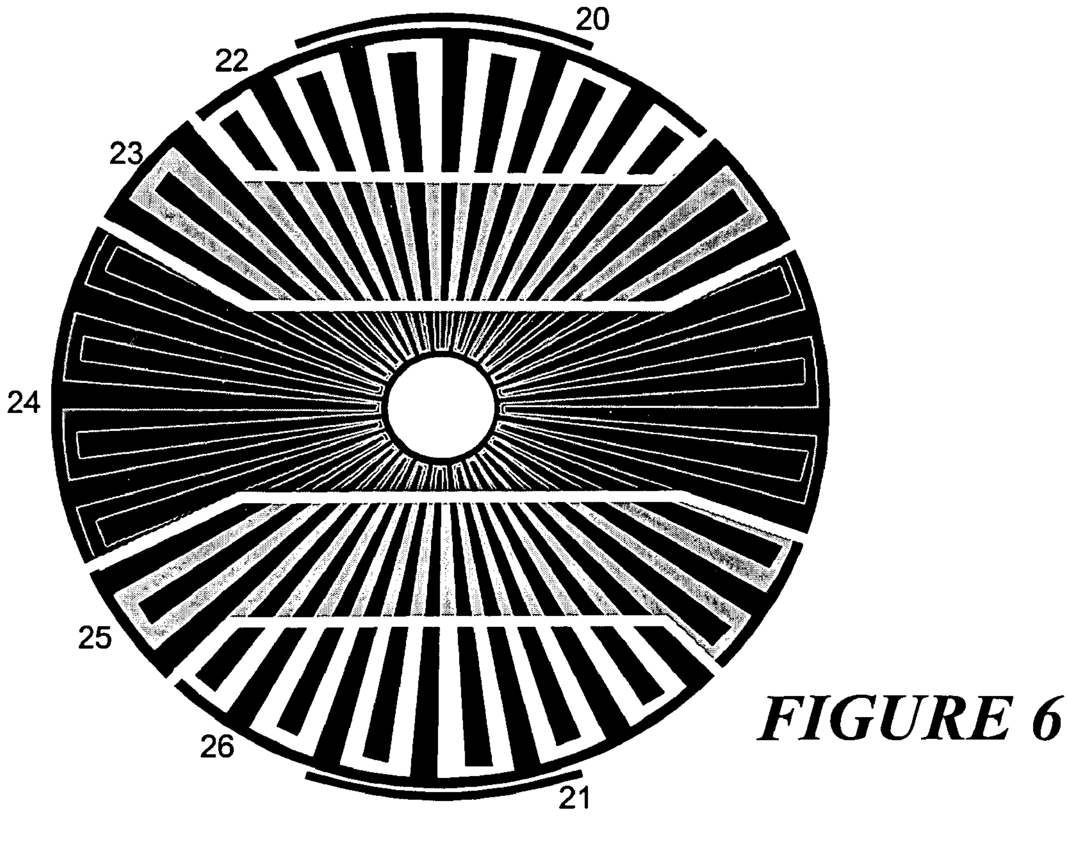
FIG. 6 illustrates the principle of a trapping plate whose radially-aligned trapping electrodes are roughly divided into fields which can be charged with attenuated excitation pulses during the excitation phase. This arrangement excites ions also in the vicinity of the trapping electrodes, in a similar manner as in the center of the measuring cell. The principle used here has come to be known as an “infinity cell”.

An arrangement like this can also be introduced for the RF grids of the trapping electrodes, as can be seen from FIG. 6. Superimpositions of the trapping RF voltage (or the bipolar DC voltage) with the stepwise attenuated excitation pulses are then present at the electrodes in the individual fields. The stepwise attenuated excitation pulses can be generated by capacitive voltage dividers. The fields can easily be produced by circuit board etching techniques. The trapping electrodes, which are then not continuous, are connected to electrical feeds from the back surface via fine plated-through holes. The ends of the wire conductor paths at the field boundaries can be connected crosswise in order to maintain a uniformly distributed pseudopotential in front of the grid.

This form of the cyclotron resonance excitation with a potential distribution that is as constant as possible in every cross-section through the measuring cell is particularly important here because the ion string extends from one trapping electrode to the other and should preferably be excited in the same way along its whole length so that it performs the cyclotron circular motions. If the excitations are not uniform over the length of the measuring cell, the ion string is widened radially, and consequently maximum voltages are no longer induced in the detection electrodes.

In a magnetic field of seven Tesla, the cyclotron frequency of a singly charged ion with a mass of 1000 unified atomic mass units (amu, termed Dalton below) is 107 kilohertz. If ions with specific masses of between 50 and 5000 Daltons per elementary charge are to be measured, then the cyclotron frequencies cover the range from around 20 kilohertz (5000 Daltons) up to around two megahertz (50 Daltons). Measuring the image currents at 8 longitudinal electrodes, for example, increases the measured frequency fourfold, i.e. it covers the range from around 80 kilohertz to 8 megahertz. This frequency range has to be amplified and digitized.

If a bipolar grid with radial spokes is used, as can be seen in FIG. 3 or 5, this causes a pseudopotential to be created for the orbiting ion beam which depends on the number of bipolar spoke pairs, on the one hand, and on the orbital frequency, on the other. For 50 spoke pairs and 20 kilohertz orbital frequency, for example, which applies for ions with a mass of m=5000 Daltons, the pseudopotential depends on a polarity changing frequency w of one megahertz, which is certainly a very favorable starting point. For ions of m=50 Daltons there is then a polarity changing frequency ω of 100 megahertz, which seems very high, since the pseudopotential is proportional to $1/(\omega^2 \times m)$. As the mass m and the polarity changing frequency ω are reciprocals, however, the pseudopotential only falls off linearly with the mass m. On the other hand, a light ion with the same kinetic energy has an angle of incidence which is flatter by $1/(v \times m)$, resulting in a correspondingly longer effective time for the pseudopotential, so that the effect of the pseudopotential on the ions, whose mass is different by a factor of a hundred, only differs by a factor of ten. The light ions of mass m=50 Daltons can be used for selecting the number of spoke pairs and the magnitude of the bipolar DC voltage for reliable reflection; for heavy ions there is then automatically reliable reflection at the trapping plates.

The cyclotron frequencies in stronger magnetic fields of 9.4 or 12 Tesla are proportionally higher.

The operation of a mass spectrometer with a measuring cell according to the invention does not have to differ greatly from the operation of a conventional measuring cell. Almost any of the processes used until now can be used as the filling process if the two-phase trapping RF voltage or the bipolar alternating DC voltage applied to the trapping electrodes is temporarily substituted with a single DC voltage. In this case, however, the filling is restricted to ions of only a single polarity. To completely remove the magnetron motions of the ions, however, a quadrupolar excitation of the ions is required, which is unusual in commercial mass spectrometers.

The measuring cell can also be filled through the structures of the trapping electrodes if there is a central grid over the aperture and a trapping RF voltage is applied. This filling process is, in fact, simpler. While the RF voltage applied to the trapping electrode opposite the ion input is kept at the same value, the voltage at the input is reduced. Many ions from the ion beam, which is injected at a low energy of around 300 to 500 millielectron-volts perpendicular to the trapping electrodes, can then pass the pseudopotential saddles between the wires. As they pass through, they usually experience a slight lateral deflection which forces them to execute a cyclotron helical motion with a minuscule diameter. At the same time, part of the kinetic energy in the forward direction is converted into kinetic energy for the helical motion. During the return from the reflecting electrode on the rear of the measuring cell, it is precisely this helical motion which prevents the ions from overcoming the pseudopotential saddles in backward direction; they are thus confined.

A particularly favorable method for filling the measuring cell is achieved if the ions can be held temporarily in a store outside the magnetic field. This type of intermediate storage can be carried out in section (7) of the ion guide in FIG. 1, for example. For the filling, the ions from the intermediate storage are sent in the direction of the measuring cell with a kinetic energy of 300 to 500 millielectron-volts. Separation according to their specific mass occurs because the lighter ions fly faster. When the lightest ions have entered the measuring cell, the trapping RF voltage is continuously increased in such a way that the pseudopotential, which acts in inverse proportion to the specific mass of the ions, remains constant for the incident ions. The ions which entered the cell previously, which are lighter, can then no longer escape from the measuring cell. This filling process is very effective and simple.

Modern FTMS instruments are normally equipped with out-of-vacuum ion sources (1), such as electrospray ionization (ESI), chemical ionization at atmospheric pressure (APCI), photo ionization at atmospheric pressure (APPI) or matrix-assisted laser desorption at atmospheric pressure (AP-MALDI). The ions are introduced together with clean ambient gas through a suitable capillary (2) into the vacuum of the mass spectrometer. Guided by ion guides (5), (7) and (9), the ions are then separated from the ambient gas in several differential pump stages. In most cases, one of the stages of the ion guide, for example stage (7), is designed as a quadrupole filter, which is able to select ions of a specific mass (or a small mass range), all other ions being removed by orbital instabilities in the RF quadrupole field. Such instruments are abbreviated to QFTMS. The quadrupole filter makes it possible to specifically fill the measuring cell with ions of one specific mass, or with the isotope group of the ions of one substance.

Ions selected in this way can then be fragmented in the measuring cell into so-called daughter ions. These daughter ions provide information about internal structures of the ions. The amino acid sequences of proteins or peptides can be determined in this way, for example.

In modern FTMS instruments, two different methods are available for the fragmentation in the measuring cell, and these methods can also be used in the measuring cell according to the invention: so-called electron capture dissociation (ECD) and infrared multiphoton dissociation (IRMPD) methods. Both types of fragmentation operate without any collision gas, and therefore do not disturb the functioning of the measuring cell, and are particularly effective for doubly charged ions. For negatively charged ions, fragmentation by electron detachment dissociation (EDD) is also an option. Both methods can also be carried out in measuring cells according to the invention.

IRMPD is brought about in the measuring cell by irradiation with infrared light (15) from an infrared laser (16) through a window (14) in the vacuum wall. The infrared radiation enters the measuring cell through the aperture in the trapping plates. The aperture can either be open or partially covered with a bipolar grid. The ions must not be in cyclotron circular motions, and therefore the fragmentation is carried out before the excitation of the ions. The ions absorb portions of energy by photon absorption until they finally decompose by breaking the bonds with low binding energies. The spectra are similar to those obtained through low-energy collisionally induced dissociation (CID).

Electron capture dissociation (ECD) is a completely different fragmentation process. This type of fragmentation is limited to biopolymers, particularly to proteins and peptides. If doubly charged (or multiply charged) biopolymers, e.g. primarily generated by electrospray ionization, capture an electron, breaking occurs at a point where a proton is adhering. This point of the biopolymer backbone is split by the neutralization energy without other points being changed. Only low-energy electrons may be offered here since only they lead to the desired type of fragmentation. The particular advantage of this fragmentation is that primarily so-called c cleavages occur, which make it relatively easy to read off the amino acid sequence.

The low-energy electrons are usually generated by a thermionic cathode; the weakly accelerated electrons then drift along the magnetic field lines to the cloud of ions. This type of electron generation can also be used in the measuring cell according to the invention. If the trapping plates have an aperture without a bipolar grid, then the introduction of the electrons presents no difficulties at all. But the electrons can also be introduced if the apertures have a bipolar grid to which an RF voltage is applied: the velocity of the low-energy electrons (around three electron-volts) is already so high that sufficient amounts of electrons can pass through the structural elements of the trapping electrodes during the zero phases of the trapping RF voltage. The admission windows around the zero phases are relatively wide, since even relatively high transverse electric fields between the wires only lead to minuscule cyclotron helical motions of the electrons with diameters of a few micrometers. The high magnetic field keeps the electrons very stably on a trajectory along the field lines.

With knowledge of the invention, those skilled in the art can design further forms of the measuring cell and the methods it makes possible for their own special measurement task.

What is claimed is:

1. Method of operating an ion cyclotron resonance mass spectrometer with a measuring cell having two ends with trapping plates at both ends, wherein each trapping plate carries a plurality of trapping electrodes across which there are DC potentials of alternating polarity during a measurement of image currents.

2. Method of operating an ion cyclotron resonance mass spectrometer comprising the following steps:

(a) providing a measuring cell in the magnetic field of the mass spectrometer which measuring cell has two ends and incorporates both longitudinal excitation and detection electrodes as well as trapping plates at both ends, wherein each trapping plate carries a plurality of trapping electrodes, (b) supplying the trapping electrodes of the trapping plates with potentials which repel ions and thus keep them in the measuring cell, (c) filling the measuring cell with ions, (d) exciting the ions to cyclotron motions by excitation pulses applied to the excitation electrodes, (e) applying two DC potentials with opposite polarity to the trapping electrodes of the trapping plates, whereby DC potentials of different polarity are connected in turn to adjacent trapping electrodes, (f) measuring the image currents generated by the orbiting ions in the detection electrodes and converting the measuring values in the usual way into specific masses.

3. Method according to claim 2, wherein the trapping electrodes are lengthy and predominantly arranged in radial direction.

4. Method according to claim 2, wherein the potentials applied in Step (b), which repel the ions, are DC potentials which are applied uniformly across all the trapping electrodes.

5. Method according to claim 2, wherein the potentials applied in Step (b), which repel the ions, are pseudopotentials which are formed by an RF voltage the phases of which are connected in turn to adjacent trapping electrodes.

6. Method according to claim 2, wherein a pure cyclotron motion without magnetron motion is produced by quadrupolar irradiation of a two-phase frequency mixture before the alternating DC potential in Step (e) is applied.

7. Measuring cell for an ion cyclotron resonance mass spectrometer the cell being located in a magnetic field, having two ends and comprising longitudinal excitation electrodes for exciting ions to a cyclotron motion in the magnetic field; detection electrodes, and trapping plates at both ends, wherein the trapping plates each carry a plurality of lengthy trapping electrodes which are predominantly arranged radially.

8. Measuring cell according to claim 7, wherein it contains more than two longitudinal detection electrodes to measure the image currents.

9. Measuring cell according to claim 8, wherein it has at least eight longitudinal electrodes, of which at least four are used for detection and at least two longitudinal electrodes positioned opposite each other to excite the ions to cyclotron motions.

10. Measuring cell according to claim 7, wherein the trapping plates each have a central aperture through which the measuring cell is filled with ions.

11. Measuring cell according to claim 10, wherein the central aperture is bridged with a grid.

12. Measuring cell according to claim 7, wherein the trapping electrodes of the trapping plates are mounted on ceramic plates, on glass or on plastic boards.

13. Measuring cell according to claim 7, wherein the trapping electrodes of the trapping plates are divided into fields which approximately represent the potential distribution as it is generated by the excitation electrodes in a central cross-section of the measuring cell, and these fields are fed with mixtures of DC voltages and stepwise attenuated excitation pulses in such a way that the electric excitation potential distributions in the measuring cell are as similar as possible in each cross-section through the measuring cell.

14. An ion cyclotron resonance mass spectrometer, incorporating a measuring cell according to claim 7.

15. Ion cyclotron resonance mass spectrometer according to claim 14, additionally incorporating an electron source for the generation of low-energy electrons.

16. Ion cyclotron resonance mass spectrometer according to claim 14, additionally incorporating an infrared laser for a multiphoton dissociation.

17. Method for confining ions in a measuring cell of an ion cyclotron resonance mass spectrometer in an axial direction, the measuring cell being located in a magnetic field, having two ends and electrodes for exciting ions to cyclotron motion in the magnetic field and the method comprising:

generating spatially alternating DC potentials at both ends of the measuring cell in order to form reflecting pseudopotentials for ions excited to cyclotron motion.

18. Measuring cell for an ion cyclotron resonance mass spectrometer, the cell being located in a magnetic field and having two ends, longitudinal excitation electrodes for exciting ions to cyclotron motion in the magnetic field and detection electrodes, wherein a plurality of lengthy trapping electrodes are radially arranged at both ends of the measuring cell and wherein two DC voltages of opposite polarities are applied to adjacent trapping electrodes.

* * * * *